April 13, 1971  A. CRONIG  3,574,618
PHOTOGRAPHIC PROCESS AND APPARATUS
Filed Sept. 3, 1968  4 Sheets-Sheet 1

ALVIN CRONIG
INVENTOR.

BY W. Gary Goodson

ATTORNEY.

April 13, 1971  A. CRONIG  3,574,618
PHOTOGRAPHIC PROCESS AND APPARATUS
Filed Sept. 3, 1968  4 Sheets-Sheet 2

ALVIN CRONIG
INVENTOR.

BY W. Gary Godson

ATTORNEY.

ALVIN CRONIG
INVENTOR.

BY W. Gary Goodson
ATTORNEY.

United States Patent Office 3,574,618
Patented Apr. 13, 1971

3,574,618
PHOTOGRAPHIC PROCESS AND APPARATUS
Alvin Cronig, Lexington, Mass., assignor to
Itek Corporation, Lexington, Mass.
Filed Sept. 3, 1968, Ser. No. 756,797
Int. Cl. G03c 5/24, 5/38
U.S. Cl. 96—48                                    20 Claims

ABSTRACT OF THE DISCLOSURE

Improved photographic gel processes, apparatus, and compositions wherein the photographic materials are carried in a gel composition. The gel composition preferably comprises the reaction product of a solution of image forming materials and a gel former. Preferably the gel composition structure is heat-reversible and flexible. In a preferred method of this invention, a photosensitive copy medium is exposed and contacted with a gel composition comprising a reaction product of a solution of image forming materials and a gel former. The gel composition is allowed to remain in contact with photosensitive material for a sufficient time to process the exposed photosensitive material. The gel composition is cooled during the processing in order to form a layer which is strippable from the photosensitive material. In one embodiment of this invention, the gel composition is in the liquid or viscous state when it is contacted with the photosensitive layer. The gel composition also may be in the form of a tape, gel roller, or the like when it is brought into contact with the photosensitive layer. Another preferred embodiment of this invention is where the gel composition is heat reversible and therefore, can be heated after use to convert to a liquid or viscous state and can then be reused in the system which requires a liquid or viscous gel composition for the starting material. A gel composition comprising a solution of metal ions or physical developer is an especially preferred system.

BACKGROUND OF THE INVENTION

(1) Field of the invention

This invention relates to the field of photographic reproduction systems and more particularly to a dry processing method and apparatus wherein the photographic image forming materials are carried in a gel composition structure.

(2) Description of the prior art

The need for simplified photographic processing systems has become of great interest. The conventional wet process of developing, rinse, fix, wash and dry has proven to be cumbersome in many applications. Additionally, it is often important to view results quickly, and if possible, without involved complicated processing technique and bulky, expensive equipment. For example, in aerial photography it is desirable to obtain shorter and shorter access, or dry to dry time, with less complex hardware and simpler processing systems.

U.S. Pat. 3,349,687 to Goldhammer discloses a developer-processor for photographic web material. As disclosed in the Goldhammer patent low viscosity aqueous solutions of processing chemicals are utilized to saturate a web with processing materials which is brought into contact with a web or strip of photographic materials and thereafter the processing web is stripped away from the photographic material. One of the main features of the apparatus is the means required for drying the wet emulsion side of the processed film. The Goldhammer patent is not concerned with dry processing nor with gel compositions for carrying processing materials.

U.S. Pat. 3,282,695 to Narodny describes a photographic processing system wherein the complete processing cycle is accomplished substantially as a semi-dry operation. As disclosed in the Narodny patent, a polyacrylamide is added to the developer solution which is then applied to a carrier strip and thereafter a fixing solution containing an aldehyde at a specific pH is applied over the layer of developer solution. The combined solutions form a gel-like coating on the carrier strip which is then pressed into contact with an exposed film strip to diffuse the processing solutions to the film. The gel coated carrier strip is then stripped from the film.

Canadian Pat. 766,182 describes a photographic processing system in which a viscous processing solution is formed by adding a thickening agent such as a polymeric, water-soluble polyhydroxy containing compound comprising a gum mucilage. The viscous processing solution is then applied to the emulsion layer containing borate ions which are carried to react with the gum mucilage polyhydroxy compound causing the viscous solution to be gelled or "set." After processing is complete the gelled layer is removed.

The prior art methods suffer from a number of disadvantages. The wet process disclosed in the Goldhammer patent is limited to low viscosity processing chemicals to facilitate saturation of the web material. Additionally the web material does not permit the versatility as provided in accordance with the present invention.

The Narodny patent and the Canadian patents each require as a separate step the mixing of two separate ingredients to form a gel or gel-like layer. The two ingredients are mixed in separate solutions and brought together for the first time on the film to be processed. The complexities of such a system are a disadvantage where simplicity of operation together with low manufacturing costs are desired.

Therefore, it is desirable to provide an improved method and apparatus for photographic processing systems wherein the processing cycle may be accomplished as a semi-dry or dry operation.

It is also desirable to provide an improved method of processing photosensitive materials in which the image forming materials are carried in a gel composition.

It is also desirable to provide an improved method of processing photosensitive materials of the type described above in which the gel composition may be readily used over and over again until the image forming materials are used up.

It is further desirable to provide an improved method of processing photosensitive materials of the type described above in which the gel composition may be melted and re-used.

It is also desirable to provide an improved method for processing photographic materials in small area such as microfiche or large area sheet form.

It is further desirable to provide an improved method and apparatus for processing photographic materials in strip or web form.

It is further desirable to provide a new and improved apparatus for processing of photographic materials in sheet or web form that is less complex and more reliable than equipment heretofore available.

It is also desirable to provide apparatus for processing of photographic materials in sheet or web form that is simple to operate and lower in cost than contemporary processing apparatus.

Other desirable features will in part be obvious and will in part appear hereinafter.

The invention accordingly comprises the apparatus possessing the construction, combination of elements and arrangement of parts, and the process involving the several steps and the relation and the order of one or more of such steps with respect to each of the others which are exemplified in the following detailed disclosure, and the scope of the application of which will be indicated in the claims.

For a fuller understanding of the nature and features of the invention, reference should be had to the following detailed description taken in connection with the accompanying drawings wherein.

SUMMARY OF THE INVENTION

Figure 1:
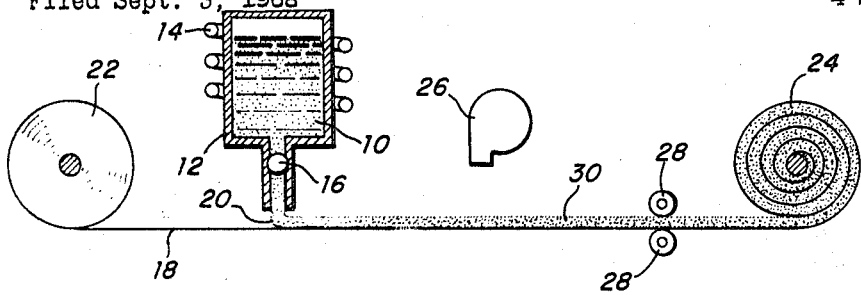
FIG. 1 is a diagrammatic, schematic sectional view of one embodiment of the invention for forming a roll of the gel composition for the subsequent processing.

This invention relates to the field of photographic reproduction systems and more particularly to a method and apparatus for processing photosensitive materials wherein the image forming materials are carried in a gel composition. Preferably the gel composition is the reaction product of a solution of image forming materials and a gel former. By reaction product as used herein, it is meant the structure resulting from the addition of a gel former to the solution of image forming materials. The resulting gel composition or structure thus serves in the process as the vehicle or carrier of the solution of image forming materials.

In a preferred method according to this invention, a photosensitive material is processed by exposing a photosensitive layer; contacting the photosensitive layer prior to, during, or subsequent to exposure with gel composition comprising the reaction product of a solution of image-forming materials and a gel former; maintaining the gel composition in contact with the exposed photosensitive material for sufficient time to process the exposed photosensitive material and cooling the gel composition to form a gel layer which is strippable from the photosensitive material. A strippable layer is defined herein to mean a layer which has relatively low adhesion to the photosensitive layer and a high degree of internal cohesion thereby allowing the gel layer to be readily stripped from the photosensitive layer. The gel layer may be stripped from the photosensitive layer after processing or may be allowed to remain on the photosensitive layer. A photographic processing tape may also be prepared in a manner similar to that described above. The process comprises providing a source of gel composition having image forming material dispersed throughout the gel, the gel forming a strippable surface when cooled to the setting temperature of the gel composition or below, applying a layer of the gel composition to the surface of the flexible support (this gel composition layer is preferably liquid or viscous at the time of application to the surface of the flexible support), sufficiently cooling the gel composition to form a strippable gel layer which may be stripped from the support or allowed to remain on the support. If the gel layer is stripped from the support, it may be utilized for processing films on both sides of the gel layer.

The gel composition of this invention may be formed into a gel roller for ease of applying the image forming materials. Thus the gel composition may be molded into a gel roller, may be formed into a gel tape and then applied to a suitable cylindrical support to form a gel roller or the tape itself may be connected at its ends to form an endless belt.

This invention is particularly adapted to forming of a gel pad or the like for the spot processing of microfiche and the like. A particularly preferred embodiment of this invention relates to a heat-reversible gel composition which can be heated after being peeled off from the photosensitive layer or flexible support to form a liquid or viscous material and then reusing the material in one of the above mentioned embodiments of this invention. Additional image-forming materials may be added to the reheated material if desired. This invention is also readily adapted to the application of multiple gel layers to a photosensitive copy medium. Thus, for example, an exposed titanium dioxide coated support could be contacted with a first layer comprising a metal ion containing solution, could then be contacted with a second layer comprising a reducing agent for the metal ion of the previous layer, and then if desired, could be contacted with a third layer comprising a fixer or stabilizer solution.

The use of a gel composition comprising the reaction product of a gel former and a physical developer has been found to have a number of unexpected properties. For example, when an exposed copy medium comprising titanium dioxide is contacted with a metal ion containing gel, removing this gel layer and then contacting the copy medium with a gel containing a reducing agent for the metal ion of the first gel a visible image is produced of comparable quality to the visible images formed by liquid and viscous processing of the prior art. However, it has been found that the gel processing just described eliminates the need for a final stabilizer or fixer processing step. This unexpected result appears to be due to the fact that the metal ion containing gel applies only the minimum amount of metal ion containing solution to the copy medium which is needed for development, then the reducing agent containing gel applies just enough reducing agent to develop the metal ion in the exposed areas, and at the same time removes metal ion from the unexposed portions of the copy medium. Furthermore, it has been found that where a copy medium comprising a photoconductor is contacted with a gel composition comprising reaction product of a gel former and a metal ion containing solution either prior to, during, or subsequent to exposure that it is possible to form a permanent latent image which can be developed much later. A permanent latent image can be formed by liquid or viscous processing. However, such a copy medium which has been processed by liquid or viscous metal ion containing solution in the past has often resulted in uneven processing. By means of this invention very uniform processing is now possible. Also in the past it was necessary to have the photoconductor deposited in a binder to get proper development having good density of substantial uniformity. It was not possible to achieve these results in the absence of a binder. This invention provides uniform development of good densities in photographic media with or without binders. Also the gel compositions enable selective processing of small areas in an economical manner. Such economical spot processing was not possible with prior art liquid or viscous developer systems. A particularly preferred embodiment of this invention comprises a camera system wherein a metal ion containing gel composition forms a means for contacting a photosensitive photoconductor layer either immediately prior to, during, or immediately subsequent to exposure of the copy medium. This gel applicator means may be in the form of a roller, a roll of gel layer which, for example, could be embodied in a cartridge, roller or pad insertion in the camera which then could be allowed to contact the photosensitive layer and then could be either rolled up with the photosensitive layer or could be rolled up in a separate roll, or could be in the form of an applicator pad. This camera embodiment of this invention would solve a number of problems in the prior art. For example, application of the metal ion containing solution to the photoconductor layer long in advance of use created problems of fogging due to the photoconductor catalyzing reduction of the metal ion to the free metal. On the other hand, due to the rapid decay rate of the latent image on a photoconductor containing copy medium it is necessary to process within a few hours after exposure of the copy medium and preferably within a few minutes.

A preferred process of forming the gel compositions is described in the co-pending application of Cronig et al. entitled "Process for Making Gels Containing Photographic Materials," filed Sept. 13, 168, Ser. No. 757,115 and incorporated herein by reference. As disclosed therein a gel former is added to a solution of image forming materials. The gases contained in the resulting composition are reduced by controlling the temperature of the composition; rate of combination of the starting materials and the agitation of the composition.

Additionally, the gel composition of the present inventin is capable of forming a readily strippable surface when cooled to the setting temperature of the gel composition or below. Accordingly, the gel compositions may be readily used over and over again until the image forming materials are used up.

A preferred gel composition is described in the co-pending application of Cronig entitled "Improved Gel Carriers Containing Photographic Materials," filed Sep. 3, 1968, Ser. No. 757,114, now abandoned, and incorporated herein by reference. As disclosed therein the gel composition is one having a low ratio of gel former weight to weight of solution of image forming materials. A preferred system comprises a natural polysaccharide.

Preferred materials are ones which are "liquid" when heated. As these gel compositions cool, they form a "sol," which is a viscous material. Finally, on further cooling, the sol sets and gains rigidity thereby forming what is termed "gel."

It is understood that the cooling referred to herein can be performed by an external cooling means or may be merely due to the environment in which the liquid or viscous gel composition is placed.

The preferred gels resemble highly viscous solutions except that they do have a degree of rigidity. The preferred gels have a structure which resembles a random array of inter-positioned fibrils. These fibrils are formed from the alignment of the individual gel forming structure. 1–2% of the liquid reacted with the gel former is used to wet the gel former and is held as part of that structure. The remaining 98–99% of the liquid is available for use as in photographic processing and the like. The preferred gel compositions are composed of a low ratio of gel former weight to weight of solution of image forming materials. Preferably the gel former weight will comprise less than about 10% and more preferably less than about 5% of the weight of solution of image forming materials. The gels of the preferred gel compositions have a break strength of from about 100 grams to about 600 grams per $\frac{1}{32}$ inch diameter plunger. The solid gels of the preferred gel compositions have an elasticity range of from about 1% to about 50% elongation in a plane parallel to the plane of the layer.

Image-forming materials according to this invention are intended to include chemical or physical developers, fixers, stabilizers, photographic monobaths, wash solutions, inks, dyes, and metal treating solutions.

The photosensitive materials may be any materials to which image-forming materials or other liquids may desirably be applied. Preferred photosensitive materials are ones which produce metallic images upon photographic processing as, for example silver halide systems and systems capable of being physically developed. Photosensitive photoconductors such as titanium dioxide are especially preferred.

The inert carrier sheet upon which the photosensitive material is deposited comprises any suitable backing of sufficient strength and durability to satisfactorily serve as a reproduction carrier. The carrier sheet may be in any form such as, for example, sheets, ribbons, rolls, etc. This sheet may be made of any suitable materials such as wood, rag content paper, pulp paper, plastics such as, for example, polyethylene terephthalate (Mylar) and cellulose-acetate, cloth, metallic foil and glass. The preferred form of the carrier sheet is a thin sheet which is flexible and durable. An aluminum or other metallic support useful in producing printing plates is also preferred. It is also useful to use a binder agent to bind the photosensitive material to the carrier sheet. In general, these binders are translucent or transparent so as not to interfere with transmission of light therethrough. Preferred binder materials are organic materials such as resins. Examples of suitable resins are butadiene-styrene copolymer, poly(alkyl acrylates) such as poly-(methyl methacrylate), polyamides, polyvinyl acetate, polyvinyl alcohol and polyvinylpyrrolidone. Gelatin or other protein type binder is also suitable.

Physical developers according to this invention are intended to include those image-forming systems such as described in U.S. Pat. 3,152,903 in British patent specification No. 1,043,250 and British Pat. 1,064,725. These image-forming materials include preferably an oxidizing agent and a reducing agent. Such image-forming materials are also often referred to in the art as electroless plating baths. Electrolytic development such as taught in U.S. Pat. 3,152,969 can also be used. The oxidizing agent is generally the image forming component of the image forming material. However, this is not necessarily true. Either organic or inorganic oxidizing agents may be employed as the oxidizing component of the image forming material. The oxidizing and reducing agent may be combined in a single processing solution or may also be in separate solutions. Preferred oxidizing agents comprise the reducible metal ions having at least the oxidizing power of cupric ion and include such metal ions as $Ag^+$, $Hg^{+2}$, $Pb^{+4}$, $Au^{+1}$, $Au^{+3}$, $Pt^{+2}$, $Pt^{+4}$, $Ni^{+2}$, $Sn^{+2}$, $Pb^{+2}$, $Cu^{+1}$, and $Cu^{+2}$.

Photographic reducing agents used as image-forming materials in this invention are inorganic compounds such as the oxalates, formates and ethylenediaminetetraacetate complexes of metals having variable valence; and organic compounds such as dihydroxy-benzenes, aminophenols, and aminoanilines. Also, polyvinylpyrrolidone, hydrazine, and ascorbic acid may be used as reducing agents in this invention. Suitable specific reducing compounds include hydroquinone or derivatives thereof, o- and p-aminophenol, p-methylaminophenol sulfate, p-hydroxphenyl glycine, o- and p-phenylenediamine, 1-phenyl-3-pyrazolidone, alkali and alkaline earth metal oxalates and formates.

Liquid physical developer systems are preferred for use as image forming materials because of the excellent results obtained therewith. Any suitable solvent may be utilized. However, aqueous processing solutions are preferred. While the pH of the solution is not critical, it has been found the best results are obtained with a pH of between about 4 and 12.

Additionally, the image forming materials or physical developers may contain organic acids or alkali metal salts thereof, which can react with metal ions to form complex metal anions. Further, the developers may con-age formation and other properties found to be desirable in this art.

DESCRIPTION OF THE PREFERRED EMBODIMENT(S)

The invention will now be described by way of the following non-limiting examples:

EXAMPLE 1

In this example the polysaccharide gel former of a combination of xanthan gum and locust bean gum such as the product known as Kelgum produced by Kelco Company is employed to gel an imaging forming composition comprising acid fixer solution of the following composition:

Ammonium thiosulfate (60% solution)—265.0 cc.
Sodium sulfite—15.3 g.
Acetic acid, glacial—4.0 cc.
Water, to make 1.0 liter.

The pH of this solution is 6.5. The Kelgum polysaccharide in the amount of between about 1 to 1½% weight (10–15 grams per liter) is sufficient for use with a fixer solution to form a gel. The fixer solution is first heated to a temperature of about 150–170° F. Any air contained in the fixer solution is then removed by agitation of the solution with a mixer such as an ultrasonic mixer. To a portion of the fixer solution the gel former is slowly added to pre-soak the dry powder and form a paste. Preferably the paste is allowed to sit at room temperature (70–75° F.) for at least half an hour. The agitator which preferably has blades at two levels is introduced into the solution and preferably operated away from the center to prevent the formation of a vortex and the resultant introduction of air to the solution. The gel former paste is then added slowly to the solution while the mixer is operated at about 50 r.p.m. over a period of about one-half to one hour. The mixer is then increased to about 3,000 to 4,500 r.p.m. for 10 to 20 minutes. The speed is then reduced to about 1,000 r.p.m. for about 15–30 minutes to permit air bubbles to be removed. When the solution is allowed to cool to a temperature of about 125–130° F. or below there is formed a gel having a high breakforce and low synerisis. The gel formed is heat-reversible with a melting or solution temeprature of 145–160° F. and setting temperature of about 125–130° F. The gels produced in this manner provide a highly uniform, strippable surface.

EXAMPLE 2

In this example a polysaccharide gel former of carrageenan such as the product HWG Gelcarin produced by Marine Colloids, Inc. is employed to gel an image forming material comprising alkaline developer solution of the following composition.

Sodium metabisulfite—28.20 g.
Sodium hydroxide (50% solution)—37.00 cc.
Hydroquinone—30.00 g.
Phenidone—2.00 g.
Water, to make 1.0 liter.

The pH of this solution is 10.4. From about 2 to 2½% by weight (20–25 grams per liter) of the carrageenan is suitable to gel the developer solution. The formation of the gel is carried out in a manner similar to Example 1.

A gel produced in this manner has the same high qualities as that of Example 1 and is heat-reversible with a melting or solution temperature and setting temperature as in Example 1.

EXAMPLE 3

This example is similar to Example 2 except that the gel former is employed to gel an imaging forming material comprising a monobath solution of the following composition:

Phenidone—1.33 g.
Hydroquinone—10.6 g.
Sodium sulfite—5.3 g.
Ammonium thiosulfite—20.0 g.
Sodium bromide—2.0 g.
Sodium hydroxide (50% solution)—cc.
Water, to make 1.0 liter.

The pH of this solution is 10.5. In accordance with this example there is provided a gel containing the monobath chemicals and providing the same high quality characteristics as in the foregoing examples. The gel solution formed a uniform strippable surface when cooled to the setting temperature or below.

EXAMPLE 4

This example is the same as Example 1 in all respects except that the polysaccharide gel former comprises a combination of ½% of the Kelgum and 1% of the carrageenan. The gel product was of equally fine quality as in Example 1.

As described in more detail hereinafter the gels of the foregoing examples, when employed in the processing of exposed photosenstitive films resulted in rapid developing and fixing of images of high quality.

EXAMPLE 5

In this example the polysaccharide gel former is employed to gel an oxidizing agent of a physical developer solution of the type described in U.S. Pat. 3,380,823 granted to Gold on Apr. 3, 1960. In this example, 6 grams of Kelgum are used to get 300 cc. of 2 normal silver nitrate ($AgNO_3$) solution. The silver nitrate solution is heated to a temperature of about 125° F. and half of the gel former is added slowly and mixed with an ultrasonic mixer for about 15 minutes. The temperature is then raised to about 150° F. After about 10 minutes the remaining gel former is added and mixed for about 10 minutes. Thereafter the temperature is lowered to about 125–130° F. and the solution further mixed for about 10 minutes. A gel of the developer was formed of equal quality to those of the other examples. When the gel developer is brought into contact with the exposed area of a semiconductor coating as described in the aforesaid U.S. Pat. 3,380,823 the latent image is developed providing a visible copy of excellent quality.

EXAMPLE 6

In this example the same polysaccharide gel former of carrageenan was used as was used in Example 2 to gel an alkaline developer solution of the following composition:

|  | G. |
|---|---|
| Sodium sulfite | 75.0 |
| Phenidone | 1.0 |
| Hydroquinone | 10.0 |
| Sodium hydroxide | 5.0 |
| Water to make 1.0 liter. | |

The pH of this solution was 10.5. In the example, 300 milliliters of the solution free from gases were heated to a temperature of about 170° F. Six grams of the carrageenan gel former pre-soaked with the developer solution was added. The solution was mixed for about 30 minutes to allow gases to escape. The solution was substantially homogeneous and substantially free from air and other gases. The gel solution was cooled to a temperature of about 120° F. formed a clear gel having a uniform smooth surface. The gel surface was substantially non-adhesive, that is, strippable.

EXAMPLE 7

In this example, 300 milliliters of a commercially available alkaline silver halide developer solution was used. The solution was treated with a ultrasonic mixer to remove gases from the developer solution. The solution was heated to a temperature of between about 150–160° F. Four grams of Kelgum was added to 50–100 milliliters of the developer solution to pre-soak the gel former. The paste was allowed to remain at room temperature for about half an hour to permit gases to escape and reduce the concentration of gases. The paste was then added to the developer solution and the gel formed as in Example 1. The gel of the developer solution, produced in this manner, has the same high qualities as that of Example 1.

EXAMPLE 8

This example illustrates the high quality achieved when the developer gel is employed to process and expose silver halide photographic film. In this example, a portion of the developer gel solution of Example 7 was applied as a thin layer of approximately 3/32 of an inch thick on a glass plate. The gel layer solution on the glass plate was sufficiently cooled to gel the solutions. An exposed silver halide photographic film was then brought into contact with the surface of the gel layer for about 3 minutes at room temperature or approximately 75° F. The processed film was then stripped from the gel layer and fixed for about 30 seconds. The developed film was of uniform excellent quality and was completely free of the gel layer material.

In the processing of photographic film in continuous or sheet operation using a gel as the carrier for processing materials it is necessary that the gel be brought in contact with the film for a sufficient time to accomplish development of the image and then remove or strip away from the developed film. It is necessary that the gel have a high break force, be relatively brittle and non-adhesive. The break force of the gels prepared by the polysaccharide gel formers in accordance with the present invention were determined in the following manner. Gels were formed with solutions having pH values of from 4 to 12. The break force was measured with a Marine Colloids break force gelometer. A geared motor is used to drive a plunger at a constant rate of speed into the surface of a gel which is place on the gram scale of the gelometer. The scale pointer deflection increases until the gel ruptures. The break force in grams is taken as the maximum reading before the pointer returns to its starting point. The break force for the gels formed over the pH range of 4 to 12 was in excess of 300 grams and was between 340 to 360 grams with plunger diameters of 13/32 inch and 26/32 inch.

Referring now to the drawings, wherein like reference characters refer to like elements, and more particularly to FIG. 1 of the drawing, there is illustrated one embodiment of the invention for preparing a roll of gel layer for storage to be used for processing a photographic film at a later time. In this embodiment of the invention, a gel 10 containing, for example, a developer and fixer or monobath processing materials preferably prepared in accordance with the foreging examples is placed in a suitable container 12 provided with heating coils 14 such as electric coils connected to a suitable source of power (not shown). It is to be understood that the gel composition 10 may be originally prepared in container 12. The gel is then heated at least to its melting or solution temperature or maintained at such temperature if originally prepared in the container. Valve 16 is then opened to permit the gel solution to flow onto substrate 18 which is guided past the opening 20 from the supply spool 22 to the take-up spool 24. When it is desirable to have the gel set rapidly upon leaving the opening 20, suitable cooling means are provided such as a blower 26 which may contain a suitable coolant such as water or Freon well known to those skilled in the art. Suitable advancing and guide rolls are provided to move the substrate 18 and the uniform gel composition layer 30 supported thereon. The substrate 18 may be formed of a relatively thin paper or plastic material.

Figure 2:
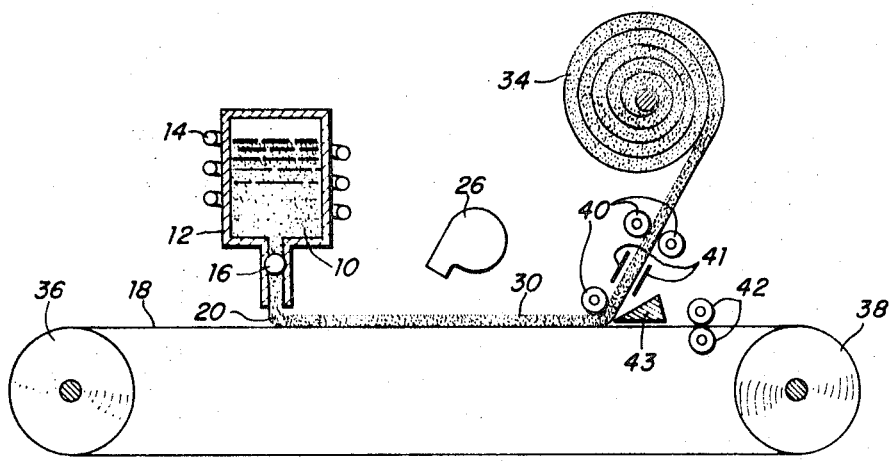
FIG. 2 is a diagrammatic, schematic sectional view of an alternate embodiment of the invention for forming a roll of the gel composition for subsequent processing.

Referring now to FIG. 2, the gel layer 30 is stripped or removed from the substrate 18 and wound upon itself by take-up spool 34. The substrate 18 is preferably arranged to operate continuously about rolls 36 and 28. Suitable advancing and guide rolls 40 and 42 and guide means 41 are provided to move the substrate 18 and gel layer along. Separator means 43 separates the gel layer from the photosensitive layer.

Figure 3:
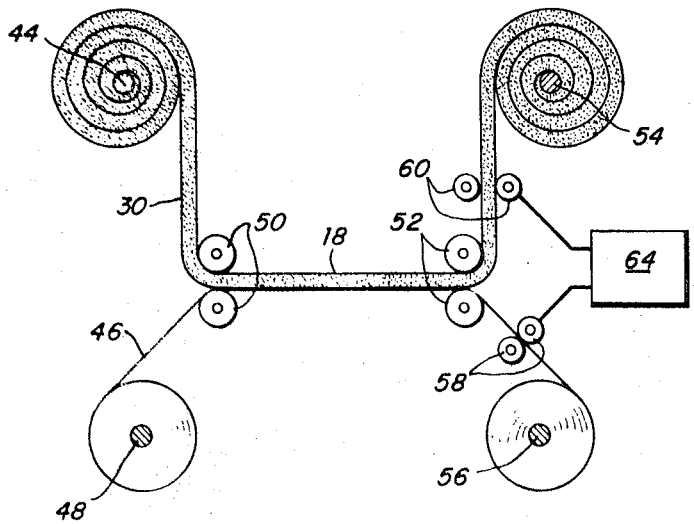
FIG. 3 is a diagrammatic, schematic sectional view of an apparatus for processing an exposed photographic film employing a gel of the type described with respect to FIG. 1.

Referring now to FIG. 3 of the drawing, there is illustrated a preferred embodiment of the invention for employing a gel layer of the type described with respect to FIG. 1 to process an exposed photographic film. In this embodiment of the invention a roll of gel layer 30 on support 18 is supported on spool 44 and a roll of exposed photographic film or paper 46 is supported on spool 48. The gel layer 30 may contain, for example, monobath processing ingredients while the exposed film may be an exposed silver halide emulsion. It is to be understood that the exposed film is protected from light in any suitable manner such as by enclosing the apparatus in a suitable container or housing (not shown). The exposed film 46 is brought into contact with the gel layer 30 for a sufficient time to permit the monobath processing materials to transfer to the exposed silver halide emulsion causing the film to be processed while it travels in contact with the gel layer. As shown in FIG. 3 the processing operation is performed by feeding the film 46 and gel layer 30 between the pairs of rolls 50 and 52. After passing through the rolls 50 and 52 the gel layer 30 and processed film are separated. The gel layer 30 is wound on take-up spool 54 while the processed film 46 is wound on take up spool 56. The film 46 and gel layer 30 are moved by suitable advancing and guide rolls 58 and 60. A suitable drive mechanism 64 is adjustable to vary the rate of travel of the film and gel layer. The required processing time, that is the time of contact, is determined by the rate of travel and distance between the contact rolls 50 and 52.

Figure 4:
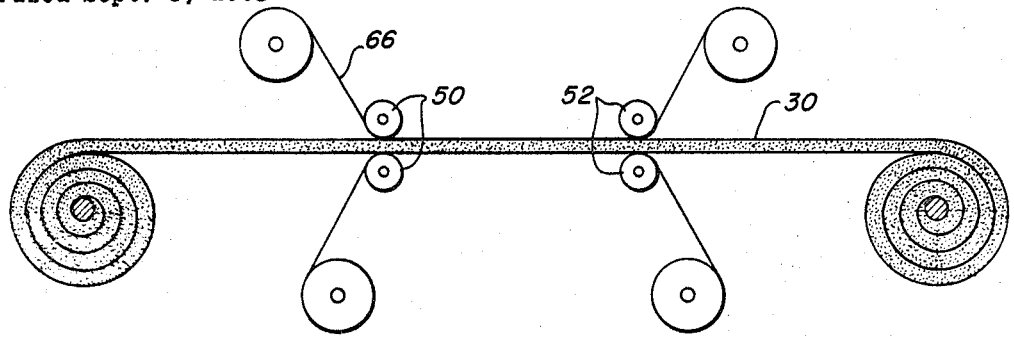
FIG. 4 is a diagrammatic, schematic sectional view of an embodiment of the invention employing a gel composition of the type described with respect to FIG. 2.

Referring now to FIG. 4 of the drawing, there is illustrated an embodiment of the invention employing a gel composition layer of the type described with respect to FIG. 2 wherein the gel layer is rolled upon itself without any backing or support 18. In this embodiment, the gel layer 30 containing, for example, monobath processing materials is used to process two exposed films simultaneously. One exposed film 66 is brought into contact with one surface of the gel layer 30 and a second exposed film 68 is brought into contact with the other side of the gel layer. Advance, guide and drive mechanisms (not shown) can be similar to those described hereinbefore.

Figure 5:
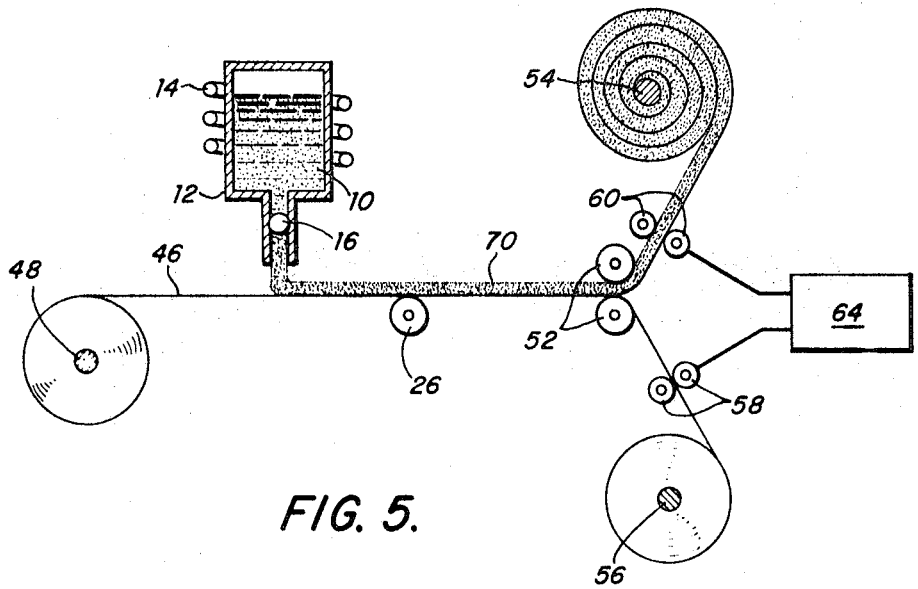
FIG. 5 is a diagrammatic, schematic sectional view of one embodiment of an apparatus for practicing the invention.

In the embodiment of the invention illustrated by FIG. 5 of the drawing, the gel supply 10 containing, for example, monobath processing materials is heated to at least its melting or solution temperature and allowed to flow onto the exposed photosensitive film 46 and then cooled to the setting temperature or below whereby the gel is set rigidly on the film in the form of a strippable cohesive gel layer. It is to be understood that a second exposed film (not shown) may also be processed by contacting it with the opposite surface of the gel layer in a manner similar to that described with respect to FIG. 4. The two films or one film and a support such as the gel layer support 18 can serve as a moisture and heat barrier to the gel layer when the environmental conditions make such barriers desirable.

Figure 6:
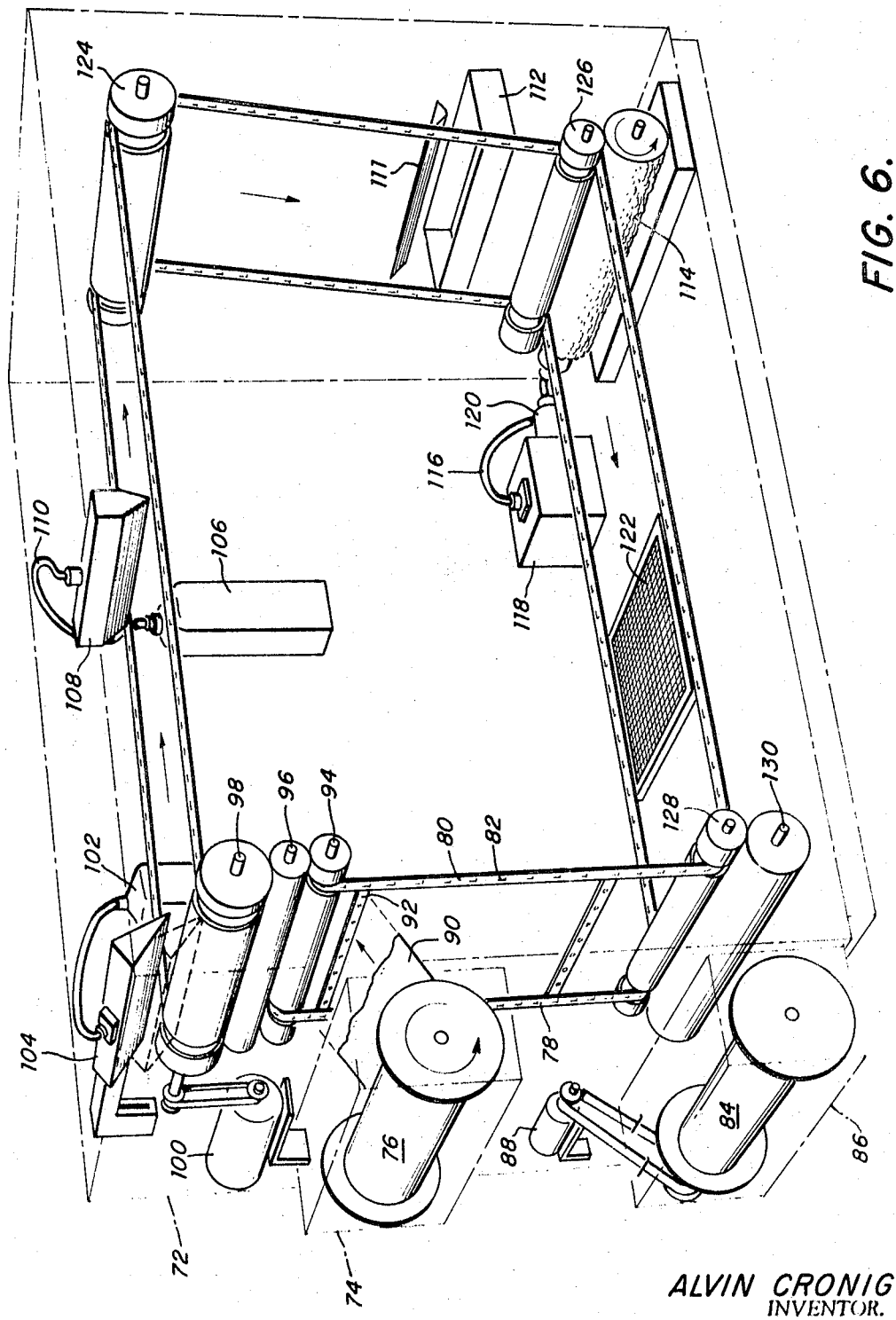
FIG. 6 is a partially perspective view, partially schematic in form, of another embodiment of the apparatus of the present invention as applied to monobath processing materials carried in a gel layer formed from a liquid or viscous gel composition during the film processing.

Reference is now made to the specific illustrative embodiment of the invention as shown in FIG. 6. This embodiment of the apparatus of the invention provides means for affixing a supply of exposed photographic film thereto, means for feeding the exposed photographic film from the supply means to a processing station where it is brought into mating contact with a gel having the photographic processing materials uniformly dispersed therein, means for forming a non-adhesive strippable layer of the gel, means for maintaining the gel in contact with the exposed photographic film for a sufficient time to permit the processing or image forming materials to move to the exposed film and process the same, means for removing the gel from the processed film, means for receiving the processed film, and other means for receiving the removed gel layer.

As shown in FIG. 6 there is provided a housing 72 which is light-tight having suitable entrance means (not shown) to provide access to the interior thereof to facilitate changing of the photographic and processing materials and any maintenance and cleaning that may be required. A removable means 74 is provided for attaching a supply spool 76 containing the exposed photographic materials. The means 74 can be any suitable compartment which can be removably affixed to the housing 72 by suitable latching or screw means (not shown). The means 74 is suitably light sealed when attached to the housing 72. The conventional light seals well known to those skilled in the art can be used and need not further be described here. Within the housing 32 there are provided a pair of continuous belts 78 and 80 which are preferably provided with notches 82. The belts are arranged to operate in parallel relationship over guide and drive means hereinafter described. A take up spool 84 is provided in a suitable compartment 86 which can be constructed and attached in the same manner as means 74 containing the supply spool. The take-up spool is provided with a takeup or overdrive motor means 88. The strip 90 of exposed photographic material or film is attached to the belts 78 and 80 by a transverse bar constructed and arranged to snap into the notches 82. The strip of photographic material 90 passes between guide rollers 94 and 96 and over drive roller 98. The drive roller 98 is driven by a suitable motor means 100. A second transverse bar 91 similar to transverse bar 92 is provided for attachment to the end of the strip of photographic material to maintain it in position during its travels.

A supply of processing materials dispersed in a gel carrier is provided in container 102. Container 102 is preferably provided with means (not shown) for heating the gel to a temperature above the melting or solution temperature of the gel. Such heating means may be electric heating coils such as heating coils 14 described with respect to FIG. 5, for example. The gel is then applied or extruded through an applicator 104 onto the exposed photographic material or film. The application of the gel carrier may be accomplished by a suitable plunger arrangement or under inert gas pressure.

Adjacent to the gel application station there is provided means for rapidly cooling the gel layer to the setting temperature or below to form a cohesive strippable gel layer. The cooling means preferably consists of a supply 106 of compressed air or coolant such as Freon. The air or coolant is directed to the gel layer by applicator means 108 suitably connected to the supply 106 by conduit means 110.

Gel stripping means 111 is provided to strip the gel layer from the processed photographic film. The stripping means is preferably a doctor blade suitably arranged to separate the gel layer from the processed film. Receptacle means 112 is preferably provided to receive the removed gel processing layer.

The apparatus is also preferably provided with an archival station. The archival station preferably consists of a cloth roller 114 connected by conduit means 116 to a supply 118 of hypo-eliminator such as, for example, a sodium sulfite solution. Suitable pumping means 120 supplies the roller 114 with the archival solution.

After the application of the archival solution the archived film is preferably dried. Heating means is preferably provided to dry the archived film. The heating means 122 is preferably a blanket heater connected by suitable means (not shown) to a source of electric power (also not shown).

Other rollers 124, 126, 128, 130 are provided to guide the belts and film through the apparatus.

In operation of the apparatus illustrated in FIG. 6 a supply spool of exposed photographic material, such as an exposed silver halide photographic film strip is attached to the apparatus. The forward end of the film strip is attached to a lead transverse bar affixed to the belts. The film strip is then conducted through the guide and drive rollers to the gel applicator station where a layer of gel solution is applied to the exposed surface of the silver halide photographic film to be developed. Preferably the rearward end of the film strip is also attached to a transverse bar. The film and the gel layer thereon are passed through the gel conditioning station where the gel layer is at least sufficiently cooled to the setting temperature or below to form a cohesive strippable gel layer adjacent the surface of exposed film. The film continues its travel until it reaches the stripping station where the gel layer is removed from the processed film. It is to be understood that the distance of travel from the gel applicator station to the gel stripping station and the rate of travel are adjusted to provide such residence time of the gel layer on the surface of the exposed photographic film to permit the processing materials carried by the gel layer such as, for example, a monobath solution, to diffuse to the exposed photographic film and process the film. After leaving the stripping station, the film is archived. The film then continues past the heating station where it is dried and thereafter wound on a take-up spool.

It is to be understood that the apparatus above described with respect to FIG. 6 can be operated in a dark room. Under these conditions the apparatus need not be light tight. In the preferred embodiment described the gel employed preferably contains a monobath solution such as, for example, the monobath solution described herein in Example 3.

Figure 7:
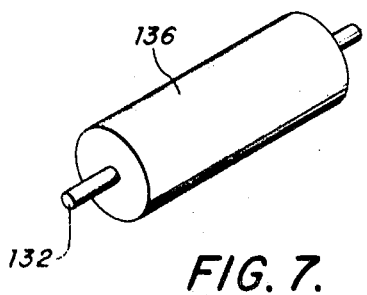
FIG. 7 is a perspective view of the gel layer in the form of a gel roller for carrying the photographic processing materials in accordance with the present invention.
Figure 7A:
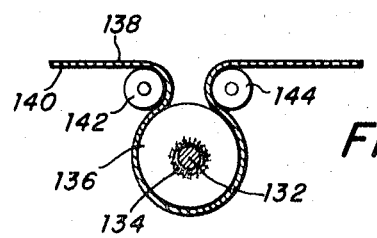
FIG. 7A is a diagrammatic, schematic, sectional, fragmentary view of the gel roller as employed in accordance with the present invention.

In accordance with a further embodiment of the present invention the gel composition containing the processing materials is constructed in the form of a roller. As shown in FIGS. 7 and 7A there is provided a roller shaft 132 which is preferably formed of a high strength plastic having an irregular or reticular surface 134 to prevent slipping of the gel layer 136 which is preferably cast upon the shaft 132.

In processing exposed photographic materials utilizing the gel roller, the exposed surface 138 of a photographic film 140 is brought into contact with the surface of the gel 136 by guide rollers 142 and 144. It is to be understood that the rate of travel of the film and the circumference of the gel roller may be varied to provide sufficient residence or contact time to process the exposed film. Also additional gel rollers can be provided to increase the contact time of the exposed photographic film with the gel containing the processing materials. The gel roller may contain a monobath solution or several gel rollers may be employed whereby one roller may contain a monobath solution or several gel rollers may be employed whereby one roller may contain a developer solution another roller a short stop solution and still another roller a fixer solution. In the latter case the exposed photographic film is passed sequentially over the developer roller, short stop roller and fixer roller.

The present invention is also particularly suitable for processing small unit areas which have been previously exposed to radiation, for example. Heretofore small unit areas such as microfiche or microphoto records were processed with large and usually involved liquid processing solutions which were sprayed or sponge delivered. Such processing usually required exposing the entire roll or film array, together with processing of the entire roll or film array. In accordance with one feature of the present invention a small area or unit of a film array may be separately exposed and processed without waiting for the exposure of the entire area or all unit areas. This feature of the invention is illustrated in FIGS. 8 and 8A.

Figure 8:
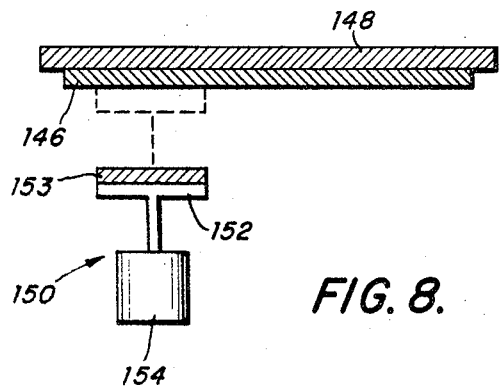
FIGS. 8 and 8A are diagrammatic, schematic, sectional views illustrating an embodiment of the invention as applied to the processing of a film array such as a microfiche.
Figure 8A:
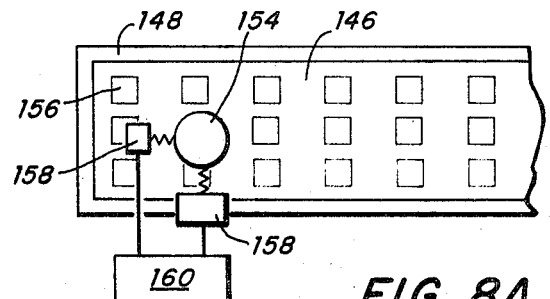

As illustrated in FIGS. 8 and 8A a film array 146, such as a microfiche, is held in position by a suitable vacuum back means 148 connected to a suitable vacuum pump or system (not shown). Positioned adjacent to the film array 146 is a gel applicator shown generally at 150. The gel applicator 150 preferably consists of a support piston 152 having a gel layer 153 carried thereon. The support is preferably formed of a porous polyurethane plastic. The support piston is preferably operated by a two position solenoid 154 for moving the piston forward (as illustrated by the dotted lines) to bring the gel layer into contact with the unit area 156 to be processed. The area of the gel layer is arranged to be coextensive with the area of the unit to be processed. After processing is complete the piston support with the gel layer is returned to its original position to await processing the next unit.

The movement and positioning of the gel layer 152 adjacent a unit area 156 to be processed can be accomplished automatically, for example, with a pair of stepping motors 158 connected with suitable logic and electronic circuitry 160. Since such logic and electronic circuitry are conventional in character and well known to those versed in the art, details of such will not be further described here.

While the invention has been described with respect to specific embodiments thereof, other applications and variations may be made within the spirit of the invention. For example, the gels containing processing materials provide particular advantage in the processing of holograms. Heretofore, holograms have been processed with wet solutions. Wet processing solutions have caused shrinkage of the hologram with the resultant distortion of the hologram image. The gel processing in accordance with the present invention overcomes such disadvantages by providing a dry processing method.

Figure 9:
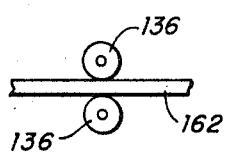
FIG. 9 is a diagrammatic, schematic, sectional, fragmentary view of an embodiment of the invention as applied to the processing of a two-sided exposed photosensitive materials utilizing gel rollers.
Figure 9A:
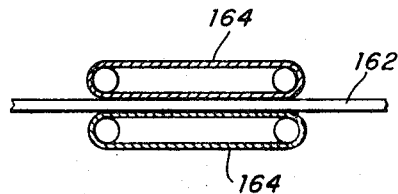
FIG. 9A is a diagrammatic, schematic, sectional, fragmentary view of an alternate embodiment of invention as applied to the processing of a two-sided exposed photosensitive materials utilizing the gel layer in strip or web form.

Additionally where two-sided processing is required such as required for dental X-ray films the two sided film 162, reference being had to FIGS. 9 and 9A, can be passed between gel rollers 136 of the type described with respect to FIGS. 7 and 7A. In a modified form of this embodiment of the present invention, the two sided film can be passed between two continuous webs or belts 164 of the gel. The gel belts can be prepared as described with respect to FIGS. 1 and 2 herein.

Figure 10:
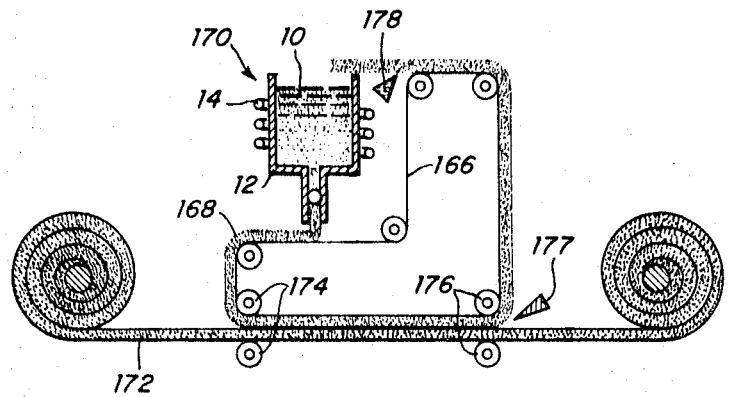
FIG. 10 is a diagrammatic, schematic, sectional, fragmentary view of the invention illustrating the use of a continuous tape for carrying the gel layer.

Referring now to FIG. 10 of the drawing there is illustrated an alternate form of the invention. As illustrated therein an endless tape 166 is coated with a layer of gel processor 168 from a supply source 170 of the gel processor. A film 172 to be processed is brought into contact with the gel processor by guide rollers 174 and 176. Other suitable rollers are provided for drying and guiding the tape and film to be processed. After processing is complete the gel layer is preferably removed from the film by doctor blade 177 and thereafter removed from the tape 166 by doctor blade 178 and then automatically returned to the supply of gel material where it is held for reprocessing.

Figure 11:
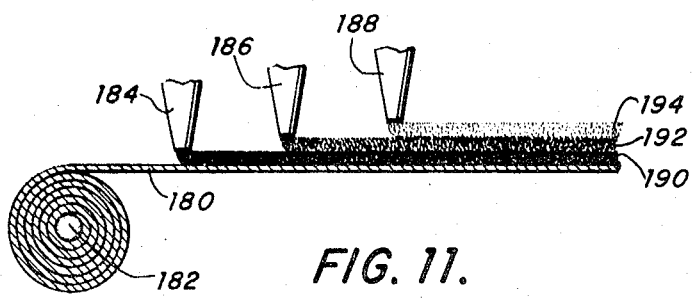
FIG. 11 is a diagrammatic, schematic, sectional, fragmentary view illustrating an embodiment of the invention wherein multiple layers of the gel composition are used.

Referring now to FIG. 11 of the drawing there is illustrated an embodiment of the invention wherein multiple layers of the gel composition are applied to a strip of exposed photosensitive material. As illustrated in FIG. 10 a photosensitive material 180 to be processed such as a silver halide system is moved from a supply spool 182 past a plurality of sources 184, 186 and 188 of gel composition, layers 190, 192, 194 are applied to the surface of the photosensitive material 180. The gel composition layer 190 may contain, for example, a silver halide developer such as described in Example 2. The second gel composition layer may contain a short stop solution such as a weak acetic acid solution. The third layer of gel composition may contain a fixer solution such as described in Example 1.

The process is accomplished by diffusion transfer of the processing chemicals. The gel composition layers may be removed or may remain and be removed from the film at a later time.

The term non-adhesive as used in the specification and claims shall mean strippable from a copy medium. The term gel former as used herein in the specification and claims shall mean a material or composition capable of increasing the viscosity of a solution and/or capable of forming a matrix structure for supporting the solution such as a gel structure and which may be heat-reversible or non-heat-reversible. While this invention has been described with respect to certain embodiments thereof, numerous modifications thereof may be made within the scope of the invention. For example, the invention is equally applicable to other gel formers including polymers, such as cellulose derivatives; plastics such as the polyvinyls, and the acrylonitrile-butadiene-styrene plastics; colloids such as, for example, gelatin, gum arabic, alginates and hydrolized vinylpolymers; polyacrylamides and starches.

Since certain changes may be made in the foregoing without departing from the scope of the invention herein involved, it is intended that all matter contained in the above description or shown in the accompanying drawings, shall be interpreted as illustrative and not in a limiting sense.

What is claimed is:
1. A method of processing a photosensitive medium comprising:
  (a) applying to said photosensitive medium a gel composition in its liquid state, said gel composition comprising a photoprocessing solution containing an amount of a gel former sufficient to gel said solution upon cooling below its setting temperature;
  (b) cooling said gel composition to a temperature below its setting temperature to form a gelled photoprocessing composition in contact with said photosensitive medium; and,
  (c) removing said gelled processing composition from said photosensitive medium after the desired processing has been completed.

2. A process of claim 1 wherein said gel former comprises a heat-reversible gel former.

3. A process of claim 2 wherein said heat-reversible gel former comprises a natural polysaccharide.

4. A process of claim 3 wherein said natural polysaccharide gel former contains at least one member selected from the group consisting of locust bean gum, xanthan gum and carrageenan.

5. A method of claim 4 wherein said gelled processing composition is stripped from the photosensitive medium after the photosensitive medium has been processed.

6. A method of claim 5 wherein said photoprocessing solution comprises at least one member selected from the group consisting of chemical developers, physical developers, fixers, stabilizers, photographic monobaths, wash solutions, and metal treating solutions.

7. A method of claim 6 wherein said photosensitive medium is capable of being chemically or physically developed to form a metallic image.

8. A method of claim 7 wherein said photosensitive medium comprises a photosensitive silver halide medium.

9. A method of processing a photosensitive material comprising providing a source of gel composition capable of forming a strippable layer upon cooling, said gel composition having image-forming materials dispersed therein; sufficently heating said gel composition to maintain it in a liquid state; applying a layer of said liquid gel composition to the surface of photosensitive material prior to, during, or subsequent to exposure; maintaining said gel layer in contact with a surface of the photosensitive material for a sufficient time to process said photosensitive material; cooling said gel layer below its setting temperature; and, subsequently removing said gel layer from the photosensitive material.

10. A method of claim 9 wherein the photosensitive material comprises a silver halide photosensitive material and the image-forming material comprises at least one member selected from the group consisting of chemical or physical developers, fixers, stabilizers, and monobaths.

11. A method of claim 10 wherein said gel layer is heat reversible and is collected after processing and remelted for reuse to process an exposed photosensitive layer.

12. A method of claim 9 wherein the photosensitive material is capable of being chemically or physically developed to form a metallic image.

13. A method of claim 1 wherein the exposed photosensitive material is one which when developed forms a halogram.

14. A method of processing film strips of photosensitive materials comprising moving a layer of gel composition having image forming materials dispersed within said gel and a non-adhesive surface about a predetermined path, moving a first strip of photosensitive material into contact with a portion of the surface of said gel layer, moving a second strip of photosensitive material into contact with a portion of the surface of said gel layer free from said first strip, maintaining said film strips in contact with said gel layer for a sufficient time after exposure to process said film strips and thereafter stripping said films from the surface of said gel layer.

15. A method of processing a film strip having a layer of photosensitive materials on each side of said strip, comprising moving a layer of a gel composition having image producing materials dispersed within said gel composition into contact with a layer of photosensitive materials on one side of said film strip, moving a second layer of gel composition having image producing materials dispersed within said gel into contact with the layer of photosensitive materials on the other side of said strip, and maintaining each gel layer in contact with said photosensitive materials for a sufficient time to process said photosensitive materials.

16. A method of processing a photosensitive material comprising exposing a portion of said photosensitive material, contacting said exposed portion with a gel composition comprising the reaction product of a solution of image forming materials and a gel former, said gel composition being capable of forming a strippable surface when cooled to the setting temperature of the gel composition or below for at least a sufficient time to process said exposed photosensitive material, exposing a further portion of said photosensitive material and processing said further exposed portion with said gel composition.

17. A method of processing a photosensitive material comprising applying a plurality of layers of a gel composition comprising the reaction product of a solution of image forming materials and a gel former upon the surface of the exposed photosensitive material, at least the gel composition layer adjacent to the surface of said exposed photosensitive material being capable of forming a strippable surface when cooled to the setting temperature of said gel composition or below, and maintaining said contact position for at least a sufficient time to process said photosensitive material.

18. The method of claim 17 wherein the first gel layer comprises a photographic developer and the subsequent gel layers comprise fixers or stabilizers.

19. The method of claim 1 wherein the photosensitive material comprises a metallic support having a photosensitive surface.

20. The method of claim 19 wherein the support is a copper, aluminum, zinc, or stainless steel support.

References Cited

UNITED STATES PATENTS

| | | | |
|---|---|---|---|
| 3,282,695 | 11/1966 | Narodny | 96—61 |
| 3,179,517 | 4/1965 | Tregillus | 96—61 |
| 3,425,832 | 2/1969 | Bornemisza | 96—48 |
| 3,238,043 | 3/1966 | Levy | 96—61 |

NORMAN G. TORCHIN, Primary Examiner

E. C. KIMLIN, Assistant Examiner

U.S. Cl. X.R.

96—61